US012740904B2

(12) United States Patent
Güttler et al.

(10) Patent No.: US 12,740,904 B2
(45) Date of Patent: Sep. 22, 2026

(54) SUPPORT DEVICE FOR SUPPORTING A BODY PART OF A USER

(71) Applicant: CO12 GmbH, Lichtenfels (DE)

(72) Inventors: Ingo Güttler, Lichtenfels (DE); Frank Ziermann, Lichtenfels (DE)

(73) Assignee: CO12 GmbH, Lichtenfels (DE)

( * ) Notice: Subject to any disclaimer, the term of this patent is extended or adjusted under 35 U.S.C. 154(b) by 0 days.

(21) Appl. No.: 18/712,065

(22) PCT Filed: Nov. 18, 2022

(86) PCT No.: PCT/EP2022/082439
§ 371 (c)(1),
(2) Date: May 21, 2024

(87) PCT Pub. No.: WO2023/089111
PCT Pub. Date: May 25, 2023

(65) Prior Publication Data

US 2025/0025359 A1 Jan. 23, 2025

(30) Foreign Application Priority Data

Nov. 22, 2021 (DE) ..................... 10 2021 130 449.0

(51) Int. Cl.
*A61G 7/075* (2006.01)
*A47C 20/02* (2006.01)
*A61G 7/065* (2006.01)

(52) U.S. Cl.
CPC ............ *A61G 7/075* (2013.01); *A47C 20/023* (2013.01); *A61G 7/065* (2013.01); *A47C 20/02* (2013.01)

(58) Field of Classification Search
CPC ..... A47C 20/021; A47C 20/023; A47C 20/02; A61G 7/0755; A61G 7/075; A61G 7/065;
(Continued)

(56) References Cited

U.S. PATENT DOCUMENTS 2,657,716 A * 11/1953 Ford ........................ D03D 1/02
296/107.1
3,831,206 A * 8/1974 Geary .................... A47G 9/086
5/413 R
(Continued)

FOREIGN PATENT DOCUMENTS

CA 3238400 A1 * 5/2023 ............. A61G 7/075
CN 118265511 A * 6/2024 ............. A61G 7/075
(Continued)

OTHER PUBLICATIONS

Notice of Refusal (with English translation) received in corresponding Application No. JP 2024529622, dated Apr. 9, 2025, 12 pages.
(Continued)

*Primary Examiner* — Robert G Santos
(74) *Attorney, Agent, or Firm* — Dority & Manning, P.A.

(57) ABSTRACT

A support device for supporting at least one body part of a user includes a support body for supporting at least one body part of a user at least in sections, optionally completely, including a first support body part comprising a support contour for a body part to be supported, and a second support body part which can be connected or is connected to the first support body part, wherein the second support body part is arranged or formed below the first support body part, forming an intermediate space extending between the first support body part and the second support body part.

9 Claims, 4 Drawing Sheets

Figure 1:
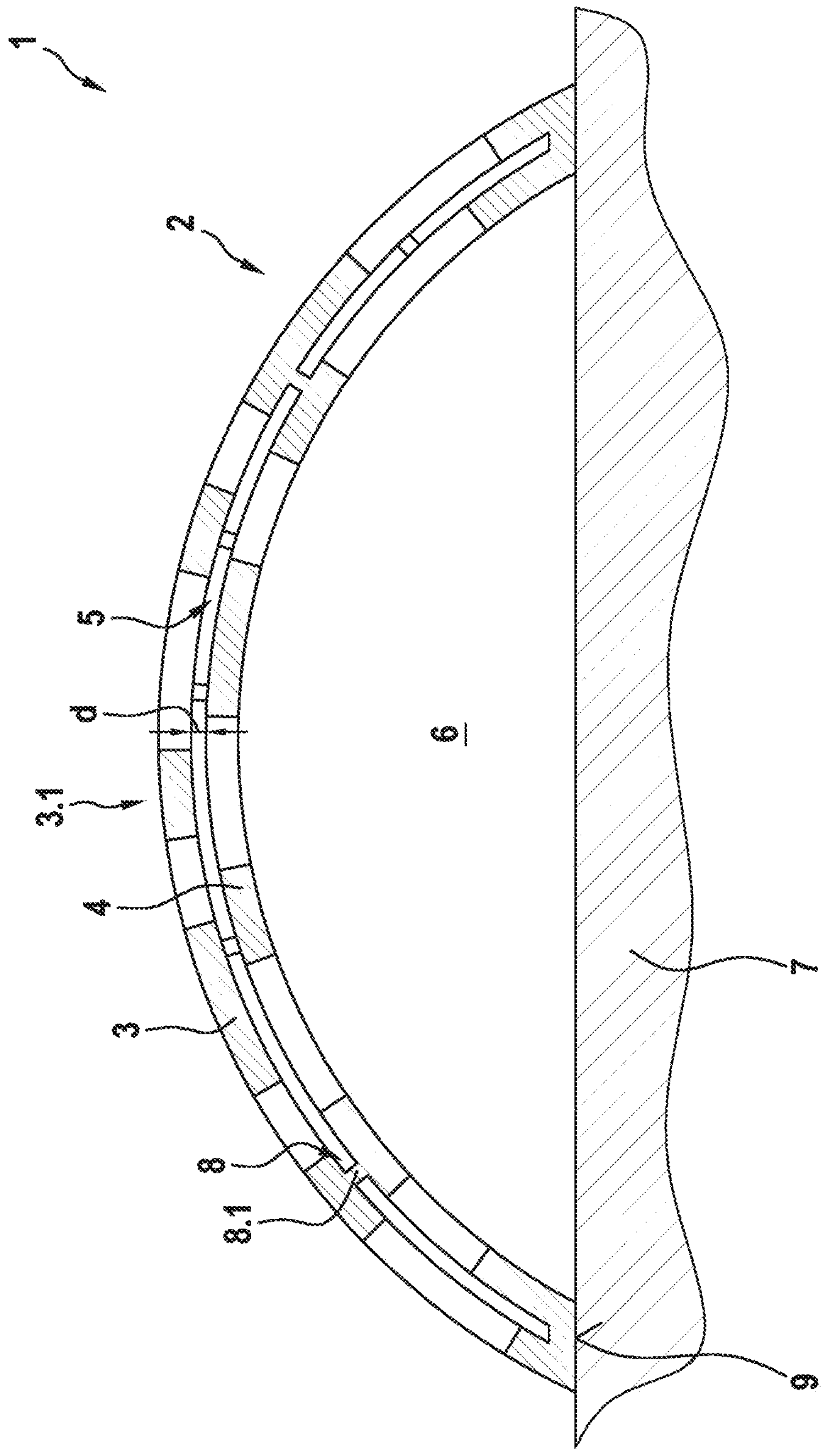

(58) Field of Classification Search
CPC ............ A61G 13/1245; A61G 13/1235; A61G 13/1205
USPC ............................. 5/648, 646, 623, 624, 621
See application file for complete search history.

(56) References Cited

U.S. PATENT DOCUMENTS

| | | | | | |
|---|---|---|---|---|---|
| 3,857,125 | A * | 12/1974 | Hunt | A47G 9/086 5/413 R |
| 3,959,834 | A * | 6/1976 | Hunt | A47G 9/086 5/413 R |
| 3,988,791 | A * | 11/1976 | Simon | A47G 9/086 5/413 R |
| 4,082,257 | A * | 4/1978 | Strickland | A61G 13/0045 5/606 |
| 4,896,387 | A * | 1/1990 | Malcolm | A47G 9/086 5/413 R |
| 6,018,830 | A * | 2/2000 | Howe | A47G 9/086 5/413 R |
| 7,549,232 | B2 | 6/2009 | Tadin | |
| 8,707,479 | B2 * | 4/2014 | Benninger | A47G 9/086 5/413 R |
| 8,955,177 | B2 * | 2/2015 | Benninger | A47G 9/086 5/413 R |
| 9,101,233 | B2 * | 8/2015 | Benninger | A47G 9/08 |
| 9,827,155 | B2 | 11/2017 | Huttenhuis et al. | |
| 2005/0116380 | A1 * | 6/2005 | Tadin | A63B 60/06 264/222 |
| 2013/0180530 | A1 | 7/2013 | Choi et al. | |
| 2014/0013506 | A1 * | 1/2014 | Benninger | A47G 9/086 5/413 R |
| 2014/0077547 | A1 * | 3/2014 | Huttenhuis | A61G 5/1043 29/402.01 |
| 2014/0230148 | A1 * | 8/2014 | Benninger | A47G 9/08 5/413 R |
| 2014/0345051 | A1 * | 11/2014 | Benninger | A47G 9/086 5/413 R |
| 2025/0025359 | A1 * | 1/2025 | Güttler | A61G 7/075 |

FOREIGN PATENT DOCUMENTS

| | | | | |
|---|---|---|---|---|
| DE | 202016104715 | | 9/2016 | |
| DE | 102017130685 | | 6/2019 | |
| DE | 102018203793 | | 9/2019 | |
| DE | 102019135329 | | 6/2021 | |
| DE | 102021130449 | A1 * | 5/2023 | A61G 7/075 |
| DE | 102021130449 | B4 * | 8/2023 | A61G 7/075 |
| JP | 3009534 | U | 4/1995 | |
| JP | 3049881 | U | 6/1998 | |
| JP | 2018535076 | A | 11/2018 | |
| KR | 20240095319 | A * | 6/2024 | A61G 7/075 |
| WO | WO2010/133667 | | 11/2010 | |
| WO | WO 2021/122792 | A1 | 6/2021 | |
| WO | WO-2023089111 | A1 * | 5/2023 | A61G 7/075 |

OTHER PUBLICATIONS

PCT International Search Report (w/ English translation) for corresponding PCT Application No. PCT/EP2022/082439, dated Mar. 2, 2023, 5 pages.

Written Opinion of the International Searching Authority for corresponding PCT Application No. PCT/EP2022/082439, dated Mar. 2, 2023, 5 pages.

* cited by examiner

SUPPORT DEVICE FOR SUPPORTING A BODY PART OF A USER

CROSS-REFERENCE TO RELATED APPLICATIONS

This application is the U.S. National Stage entry of International Application No. PCT/EP2022/082439, filed on Nov. 18, 2022, which, in turn, claims priority to German Patent Application No. 10 2021 130 449.0, filed on Nov. 22, 2021, both of which are hereby incorporated herein by reference in their entireties for all purposes.

The invention relates to a support device for supporting at least one body part of a user, comprising a support body for supporting at least one body part of a user, at least in sections and possibly completely.

Corresponding support devices are known per se from the prior art in various configurations.

A specific example of a known support device is disclosed in document DE 10 2019 135 329 A1, which relates to a support device with a support body which has at least one support area for supporting at least one part of the body, such as a limb, of a user, at least in sections and possibly completely.

First of all, the mechanical stability of known support devices, i.e. in particular their mechanical stability against forces acting on the support body when used as intended, is in need of improvement. It has been shown that the forces acting on the support body when used as intended can be comparatively high in certain clinical pictures, such as spastic hands, so that additional mechanical stabilization is desirable.

The possibility of easily creating unauthorized counterfeit products is still in need of improvement in known support devices, so that a practicable implementation of a measure that at least makes it more difficult to create unauthorized counterfeit products is desirable.

On this basis, the present invention is based on the object of providing an improved support device for supporting a body part of a user. The support device is to be improved in particular by improved mechanical properties and by a practicably implementable or implemented measure which at least makes the realization of unauthorized imitation products more difficult.

The object is achieved by a support device according to claim 1. The claims dependent thereon relate to possible embodiments of the support device.

A first aspect of the invention relates to a support device for supporting at least one part of the body of a user, at least in sections and possibly completely. The support device thus generally serves to support at least one part of the body of a user, at least in sections and possibly completely. The term “user”, when used in the following, shall include both male and female users.

The term “support” can be understood as the positioning or bearing of at least one body part or at least one body part section. The support device can therefore also be referred to or regarded as a bearing device. The support body associated with the support device can accordingly be referred to or regarded as a bearing body. The support contour on the bearing body side can accordingly be referred to or regarded as the bearing contour.

The term “body part” can be understood both as a body part and as a body part section. An example of a body part is the torso or a limb. An example of a body part section is therefore a trunk section or a limb section.

The term “limb” can be understood both as a complete limb (extremity) and as a limb section of a superordinate limb. An example of a limb is therefore an arm or a leg. An example of a limb section is therefore a hand or a foot. However, a hand or a foot can also be an example of a limb. An example of a limb section can therefore also be a finger or a toe. The support device can thus be designed to support a limb of an upper extremity of a user, in particular a hand, a hand section, an arm or an arm section, or to support a limb of a lower extremity of a user, in particular a foot, a foot section, a leg or a leg section.

The support device is typically used for supporting or positioning body parts, i.e. in particular limbs, or body part sections, i.e. in particular limb sections, of the human or human body; however, the support or positioning of body parts or body part sections of an animal or an animal body are also conceivable.

Although the support device can therefore have various specific areas of application, a preferred embodiment of the support device is a support device for supporting a human hand.

As mentioned, the support device comprises a support body, the functional and geometric-constructive design of which is explained in more detail below:

The support body comprises at least a first and a second support body part, in particular in contrast to the aforementioned prior art in the form of document DE 10 2019 135 329 A1. The support body is thus formed by at least two support body parts in functional as well as geometric-constructive terms.

The first support body part has a support contour for a body part to be placed on it or is designed with such a contour. The support contour is therefore the area of the support device on which a user (directly) places a body part when using the support device as intended. The support contour therefore represents the actual area of the support device on which a user places or supports a body part when using the support device as intended. The support contour therefore typically forms at least part of the (exposed) surface of the support device.

The support contour can extend at least in sections, if necessary, completely, over at least one upper side of the first support body part or form at least in sections, if necessary, completely, at least one upper side of the first support body part.

The support contour is typically formed by a predefined three-dimensional contouring or structuring configured with respect to a specific body part of a user, or comprises such a three-dimensional contouring or structuring. Accordingly, as will be explained in more detail below, the support contour can have one or more support contour sections, in particular designed as receptacles, which are set up to receive or support a specific body part section, in particular a limb section, for example a finger or a toe, of a body part to be placed or placed on the support contour, i.e. in particular a limb or a limb section.

The dimensions of the support contour are typically adapted to the dimensions of the body part to be supported, irrespective of its specific geometric and structural design. When the support device is used as intended, the support contour is therefore covered at least in sections, or possibly completely, by the body part being supported.

In addition to the first support body part, the support device comprises a second support body part that can be connected or is connected to the first support body part. The second support body part is arranged or formed below the first support body part, forming an intermediate space extending between the first support body part and the second support body part—this can also be designated as a cavity if necessary.

The connection of the two support body parts can in principle be form-fitting and/or force-fitting and/or material-fitting. As can be seen below, the second support body part may also be connected in one piece to the first support body part; this is an example of a material connection between the two support body parts.

The multi-part design of the support body with a first support body part and a second support body part and their arrangement as described, wherein the second support body part is arranged or designed at a distance from the first support body part, in particular vertically, forming a corresponding intermediate space, results in a considerable improvement in the mechanical properties of the support body, as the second support body part provides additional mechanical stability, i.e. in particular additional stiffening, of the support body.

Similarly, the multi-part design of the support body with a first support body part and a second support body part and their arrangement as described, wherein the second support body part is arranged or designed at a distance from the first support body part, forming a corresponding intermediate space, results in a geometric-constructive design of the support body which is more complex in comparison and thus—at least with conventional manufacturing processes—more complex to manufacture, resulting in a practicably implementable or implemented measure which at least makes it more difficult to easily realize unauthorized imitation products.

The principle resulting from the spaced arrangement or formation of the second support body part below the first support body part of the arrangement or formation of several support body parts in several superimposed planes can be extended beyond the first and second support body part with further support body parts as required.

All in all, this is an improved support device for supporting a body part of a user.

The first and the second support body part can have the same or different mechanical properties, at least in sections or, if necessary, completely. Although the mechanical properties of the support body are improved in any case due to the provision of the second support body part, the second support body part may, for example, have better mechanical properties than the first support body part, i.e. e.g. a higher rigidity, and thus a higher mechanical stability than the first support body part.

In all embodiments, the first support body part is typically flat. The first support body part therefore typically has a flat spatial shape. As will be seen below, this does not rule out a curved or domed spatial shape, such as a shell shape, of the first support body part. The wall thickness of the first support body part is typically in a range between 0.1 and 5 mm. The wall thickness of the first support body part can therefore be in particular 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm or 5.0 mm. The aforementioned values can also be regarded as limit values for certain wall thickness ranges. The wall thickness of the first support body part can be constant or vary in sections; in this way, the mechanical properties of the first support body part can be adjusted locally in a targeted manner by varying the wall thickness accordingly.

Likewise, in all embodiments, the second support body part is typically flat. The second support body part therefore typically also has a flat spatial shape. As can be seen from the following, this also does not exclude a curved or domed spatial shape, such as a shell shape, of the second support body part. The wall thickness of the second support body part is typically in a range between 0.1 and 5 mm. The wall thickness of the second support body part can therefore be in particular 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm or 5.0 mm. The aforementioned values can also be regarded as limit values for certain wall thickness ranges. The wall thickness of the second support body part can be constant or vary in sections; in this way, the mechanical properties of the second support body part can be adjusted locally in a targeted manner by varying the wall thickness accordingly.

As indicated, the first support body part and/or the second support body part can have a curved or domed basic shape. The two support body parts can therefore have the basic shape of a bowl or trough, for example. In particular, the second support body part can have a curved or domed basic shape modeled on the curved or domed basic shape of the first support body part. The two support body parts can therefore be arranged essentially parallel, as can be seen in particular from a sectional view of the support device. Consequently, the second support body part can be arranged or formed within the first support body part with a spacing forming a corresponding intermediate space. The underside of the first support body part facing the second support body part, which is curved or arched, for example, can therefore enclose the upper side of the second support body part, which is curved or arched, for example, at least in sections, if necessary, completely, with the proviso of a spacing forming a corresponding intermediate space.

The distance between the first support body part and the second support body part, defined in particular by the space between the two support body parts, can therefore be (essentially) constant in at least one spatial direction. The distance between the first support body part and the second support body part can, in particular, be 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.1 mm, 5.2 mm, 5.3 mm, 5.4 mm, 5.5 mm, 5.6 mm, 5.7 mm, 5.8 mm, 5.9 mm, 6.0 mm, 6.1 mm, 6.2 mm, 6.3 mm, 6.4 mm, 6.5 mm, 6.6 mm, 6.7 mm, 6.8 mm, 6.9 mm, 7.0 mm, 7.1 mm, 7.2 mm, 7.3 mm, 7.4 mm, 7.5 mm, 7.6 mm, 7.7 mm, 7.8 mm, 7.9 mm, 8.0 mm, 8.1 mm, 8.2 mm, 8.3 mm, 8.4 mm, 8.5 mm, 8.6 mm, 8.7 mm, 8.8 mm, 8.9 mm, 9.0 mm, 9.1 mm, 9.2 mm, 9.3 mm, 9.4 mm, 9.5 mm, 9.6 mm, 9.7 mm, 9.8 mm, 9.9 mm or 10 mm. The aforementioned values can also be regarded as limit values for certain distance ranges.

In all embodiments, a free space is typically formed below the second support body part. The free space extends between the underside of the second support body part facing the base and the upper side of the base facing the second support body part when the support device is placed on a base, such as a table top, as intended. The support body is therefore not a solid block, but a weight-optimized body that can typically only be placed on a surface in the area of its outer edges, i.e. on the edge.

In order to further improve the mechanical properties of the support body, the support device can comprise a support structure arranged or formed within the space between the first support body part and the second support body part. The support structure comprises at least one, in particular strut-like or strut-shaped, support element connecting the first support body part to the second support body part. The support structure thus enables a local mechanical connection of the two support body parts via corresponding support elements. In particular, the support elements are designed to transfer forces acting on the first support body part to the second support body part when the support device is used as intended. This possibility of force transmission can have a considerable positive influence on the mechanical properties of the support body. The support structure can therefore also be referred to or regarded as a force transmission structure.

The first support body part and/or the second support body part can each have one or more openings. The first support body part and/or the second support body part can thus each have an opening structure defined by one or more openings. The openings make it possible to save weight and—importantly for the aspect of implementing or integrating a practicable measure against unauthorized copying—make it possible to form a characteristic opening structure, which can in principle be designed or shaped in any complex way, and which can be used to distinguish an original product from a copycat product.

Individual, several or all openings of the respective support body parts can have geometrically defined shapes, such as circular shapes, ellipsoids, polygons, etc. Alternatively or additionally, individual, several or all openings of the respective support body parts can have free forms. Free-form shapes refer in particular to bionic shapes. Of course, hybrid shapes are also conceivable.

Individual, several or all openings of the first support body part may differ from individual, several or all openings of the second support body part with regard to at least one parameter relating to the geometric-constructive design of the respective opening, such as dimensions, shape, etc.

The same applies to the arrangement of the respective openings in the first and second support body part, so that the arrangement of individual, several or all openings—also to be understood here as the distribution of the openings over a respective support body part—can also differ.

If the first support body part and the second support body part each have one or more openings, at least one opening of the first support body part can be arranged or formed offset relative to at least one opening of the second support body part. An offset arrangement of the respective openings, which is characterized in particular by a non-aligned arrangement of the wall sections of the support body parts delimiting the respective openings, can also provide a practicable measure which at least makes it more difficult to easily create unauthorized imitation products.

As indicated, the support device can have a base for placing the support device on a surface. A corresponding support surface can be formed, for example, by a section of the first support body part and/or the second support body part, in particular on the edge.

However, it is also conceivable that the support device comprises a third support body part forming a, in particular planar, support surface for placing the support device on a base, which can be connected or is connected to the first and/or the second support body part. The third support body part can also form a section of the first and/or second support body part.

As also mentioned above, the support contour can have a certain number and/or a certain arrangement of predefined configured support contour sections, which correspond to the number and/or arrangement of the limb sections, in particular the fingers, of a respective body part of a user to be placed on the support device. The support device can therefore have a number of support sections with a predefined configuration specific to the body part and thus support sections with a standardized configuration specific to the body part. The respective support sections can, for example, be designed as predefined or standardized configured receptacles. A respective predefined or standardized configured support can be designed to hold one or more body parts. Typically, a respective predefined or standardized configured support is designed to hold (exactly) one specific body part.

In particular, the support contour can have a certain number and/or a certain arrangement of corresponding predefined or standardized configured support sections, which correspond to the number and/or arrangement of the limb sections, i.e. e.g. the fingers or toes, of a respective body part to be placed on the support contour. For the example of a hand to be placed on the support contour, the support body or the support contour can therefore have, for example, several support sections, with each support contour section serving to support a specific finger of the hand to be placed. The same applies to other parts of the body. The support contour can thus have a certain number and/or a certain arrangement of predefined configured support sections, which corresponds to the number and/or arrangement of the limb sections, in particular the fingers or toes, of a respective body part of a user to be placed on the support device. Corresponding support sections, if they serve to support a finger, can be designated or deemed to be finger support sections.

To support a hand, the support body or the support contour can therefore have at least two, in particular at least three, in particular at least four, possibly five, predefined configured finger support sections in a parallel arrangement, in particular in a substantially parallel arrangement, which corresponds to the number and arrangement of the fingers of a respective hand of a user to be placed on the support device. In this way, a relaxing effect can be achieved on a hand to be placed or placed on the support device. The respective finger support sections are typically also configured in a predefined or standardized manner. In concrete terms, the respective finger rest sections can, for example, be designed as predefined or standardized configured receptacles or recesses.

The respective finger support sections can be arranged and/or aligned so as to extend in a first spatial direction, in particular a distal spatial direction in relation to a hand to be placed or placed on the support device. In this way, a particularly relaxing effect can be achieved on a hand to be placed or placed on the support device. The same applies to other parts of the body.

The support device can furthermore have or comprise at least one further support section, in particular arranged or aligned transversely to the finger support sections, for receiving an end region of a middle hand region, i.e. in particular a proximal end region, of a user's hand to be placed on the support device. In this way, a relaxing effect can also be achieved on a hand to be placed or placed on the support device. A corresponding further support section is also configured in a predefined or standardized manner. A corresponding further support section can be specifically designed, for example, as a predefined or standardized configured receptacle or recess.

The respective finger support sections can, in particular directly, merge into the further support section. The respective finger support sections can therefore communicate, in particular directly, with the further support section. In this way, a particularly relaxing effect can also be achieved on a hand to be placed or placed on the support device.

In all embodiments, the first support body part and/or the second support body part may have a fastening interface, in particular a slot-like or slot-shaped fastening interface, for fastening a fixing element, for example a strap or belt-like fixing element, for temporarily fixing a body part placed on the support contour, in particular in an intended support position and/or support orientation of the body part on the support contour.

For all embodiments, it also applies that the first and/or the second support body part can, in particular, be an additively manufactured component. The same applies in particular to the other components of the support device, such as the support structure and/or the third support body part. Accordingly, the entire support body can be a body additively manufactured in an additive construction process, so that the first support body part and the second support body part can be connected to each other in one piece.

All additive manufacturing processes that enable the additive construction of three-dimensional objects by successive layer-by-layer selective solidification of a building material that can be successively and selectively solidified in layers, possibly in powder form—this may be a metal or a plastic, for example—can be considered for manufacturing the aforementioned components of the support device. By way of example only, reference is made in this context to binder-jet processes, selective laser melting processes, selective laser sintering processes or stereolithography processes, etc.

It should be mentioned at this point that the support device can basically be made from any material. Reference is only made to plastics, metals or ceramics by way of example. In addition to thermoplastics, such as technical thermoplastics, and thermosetting plastics, the term plastic also includes thermoplastic elastomers (TPE). It is also conceivable that the product could be made from a composite material or material structure comprising several different materials, i.e. materials that differ in at least one chemical and/or physical parameter. It is conceivable that at least the first and second support body parts are formed from different materials or material structures.

A second aspect of the invention relates to a method for manufacturing a support device for supporting at least one body part of a user, comprising a support body for at least partially, optionally completely, supporting at least one body part of a user. The method relates in particular to the manufacture of a support device according to the first aspect of the invention. The method comprises at least the steps of: Forming or providing a first support body part having a support contour for a body part to be supported; forming or providing and a second support body part connectable to the first support body part, and connecting the two support body parts by arranging or forming the second support body part below the first support body part while forming an intermediate space extending between the first support body part and the second support body part.

All explanations in connection with the support device according to the first aspect of the invention apply analogously to the method according to the second aspect of the invention and vice versa.

Figure 2:
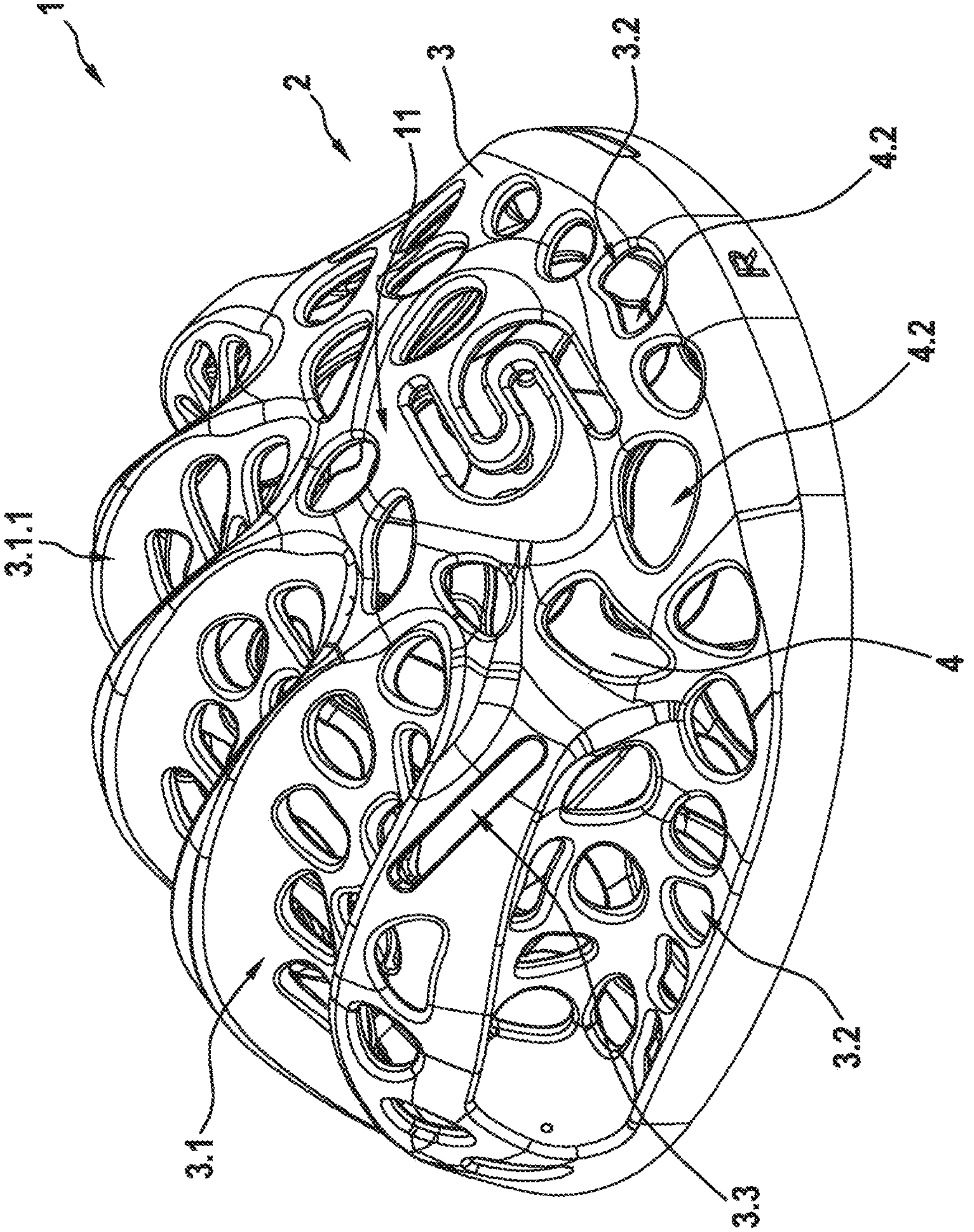
Figure 3:
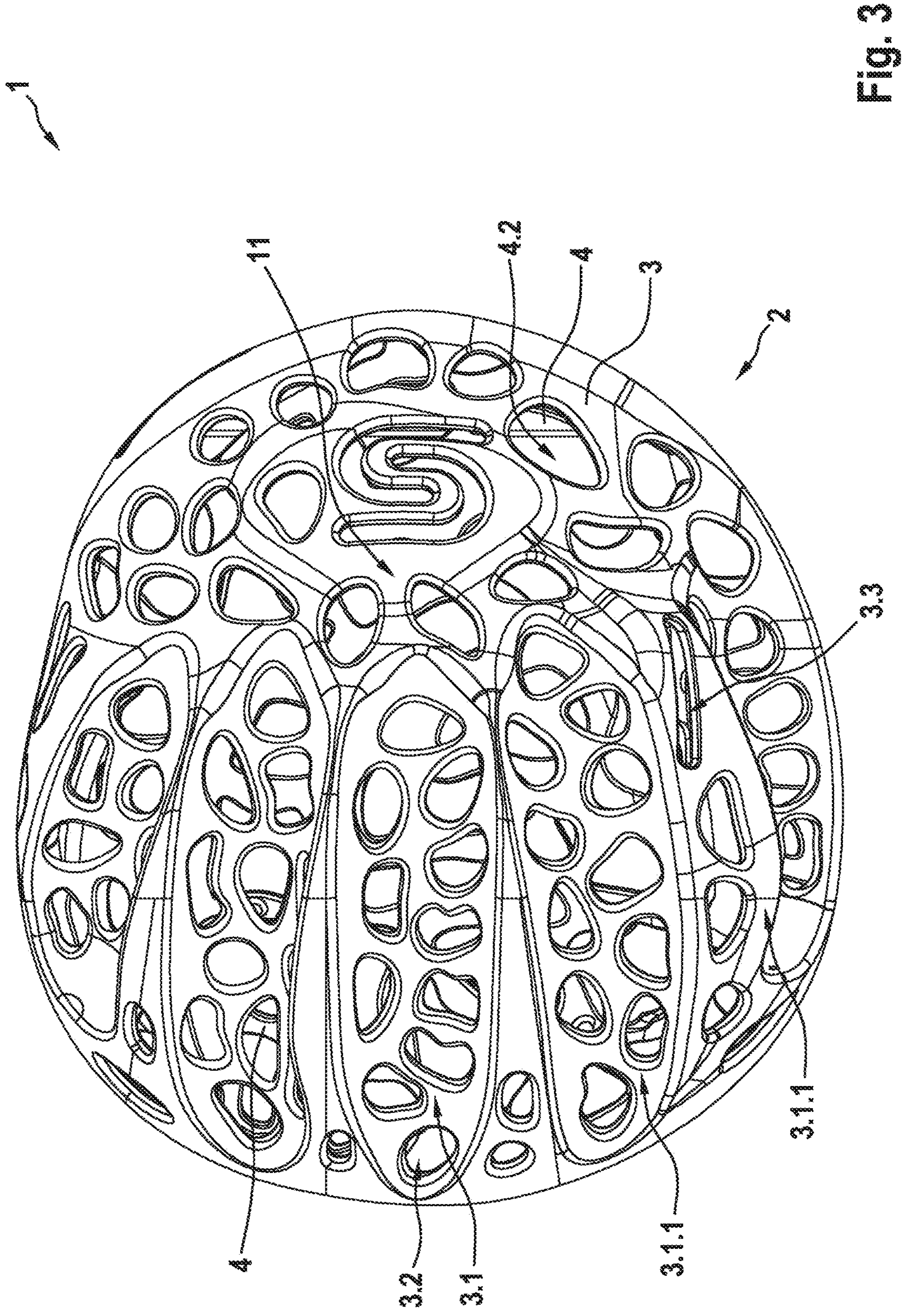
Figure 4:
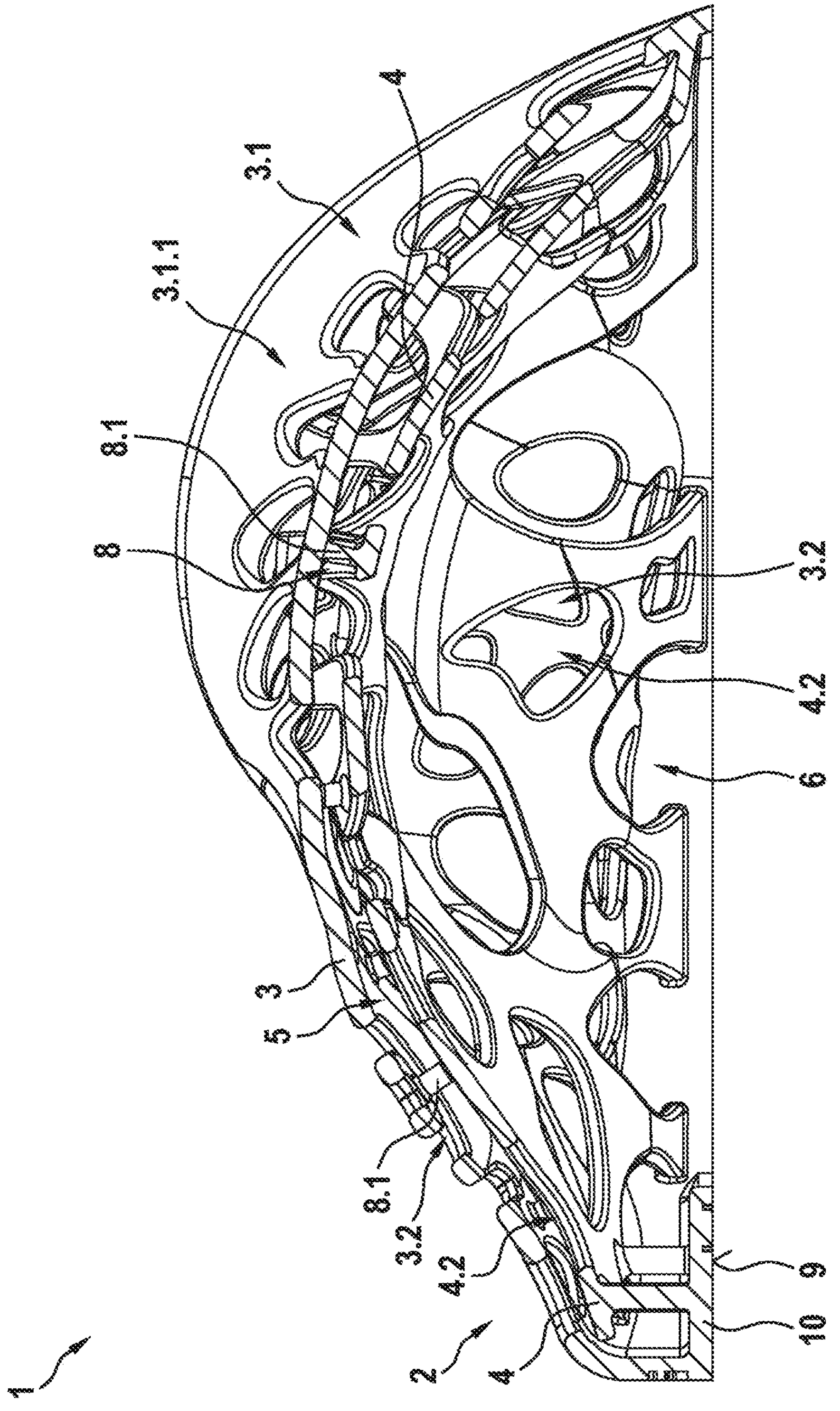

The invention is explained with reference to embodiments in the drawings. It shows:

FIG. 1 shows a principle representation of a support device 1 for supporting a part of the body (not shown) of a user according to an embodiment example in a longitudinal sectional view, and FIGS. 2-4 show a supplementary illustration of a support device 1 for supporting a part of the body (not shown) of a user according to a specific embodiment example in a perspective view of the rear side (FIG. 2), in a top view (FIG. 3) and in a longitudinal sectioned view (FIG. 4).

In all embodiments, the support device 1 is used to support at least one body part of a user, at least in sections or, if necessary, completely. In the embodiments shown in FIG., the support device 1 is used to support a user's hand; more specifically, the support device 1 shown in FIG. is used to support a user's right hand. The following explanations apply analogously to a support device 1 for supporting a user's left hand and to support devices 1 for supporting other parts of the body.

The support device 1 comprises a support body 2, the functional and geometric-constructive design of which is explained in more detail below:

Obviously, the support body 2 comprises at least a first and a second support body part 3, 4. The support body 2 is thus formed by at least two support body parts 3, 4 in functional as well as geometric-constructive terms.

It is evident that the first support body part 3 has a support contour 3.1 for a body part to be placed on it or is designed with such a contour. The support contour 3.1 is therefore the area of the support device 1 on which a user (directly) places a body part when using the support device 1 as intended. The support contour 3.1 therefore represents the actual area of the support device 1 on which a user places or supports a part of the body when using the support device 1 as intended. The support contour 3.1 therefore typically forms at least part of the (exposed) surface of the support device 1.

The support contour 3.1 can extend at least in sections, possibly completely, over at least one upper side of the first support body part 3 or form at least in sections, possibly completely, at least one upper side of the first support body part 3 and is typically formed by or comprises a three-dimensional contouring or structuring that is predefined and configured with respect to a specific body part of a user.

The support contour 3.1 accordingly has one or more support contour sections 3.1.1, in particular designed as receptacles, which are set up to receive or support a specific body part section, in particular a limb section—in the embodiment examples specifically a finger—of a body part to be placed or placed on the support contour 3.1.

The dimensions of the support contour 3.1 are typically adapted to the dimensions of the body part to be supported, regardless of its specific geometric and structural design. When the support device 1 is used as intended, the support contour 3.1 is therefore covered at least in sections, and possibly completely, by the body part being placed on it.

It is evident that the second support body part 4, which can be connected or is connected to the first support body part 3, is arranged or formed below the first support body part 3, forming an intermediate space 5 extending between the first support body part 3 and the second support body part 4—this can also be designated as a cavity if necessary.

The connection of the two support body parts 3, 4 can in principle be form-fitting and/or force-fitting and/or material-fitting. As can be seen below, the second support body part 4 can also be connected in one piece to the first support body part 3; this is an example of a material connection between the two support body parts 3, 4.

The multi-part design of the support body 2 with a first support body part 3 and a second support body part 4 and their arrangement as described, wherein the second support body part 4 is arranged or designed at a distance from the first support body part 3, forming a corresponding intermediate space 5, results in a considerable improvement in the mechanical properties of the support body 2, as the second support body part 4 provides additional mechanical stability, i.e. in particular additional stiffening, of the support body 2.

Similarly, the multi-part design of the support body 2 with a first support body part 3 and a second support body part 4 and their arrangement as described, wherein the second support body part 4 is arranged or designed at a distance from the first support body part 3, forming a corresponding intermediate space 5, results in a geometric-constructive design of the support body 2 which is more complex in comparison and thus—at least with conventional manufacturing processes—more complex to manufacture, resulting in a practicably implementable or implemented measure which at least makes it more difficult to easily realize unauthorized imitation products.

The first and second support body parts 3, 4 can have the same or different mechanical properties, at least in sections or, if necessary, completely. Although the mechanical properties of the support body 2 are improved in any case due to the provision of the second support body part 4, the second support body part 4 may, for example, have better mechanical properties, i.e. e.g. greater rigidity, and thus greater mechanical stability than the first support body part 3, compared to the first support body part 3.

It can be seen from FIG. that the first support body part can generally have a flat spatial shape. Obviously, this does not exclude a curved or domed spatial shape, such as a shell or trough shape, of the first support body part. The wall thickness of the first support body part 3 is typically in a range between 0.1 and 5 mm. The wall thickness of the first support body part 3 can be constant or vary in sections; in this way, the mechanical properties of the first support body part 3 can be adjusted locally in a targeted manner by varying the wall thickness accordingly.

It can also be seen from FIG. that the second support body part 4 can generally also have a flat spatial shape. Obviously, this also does not exclude a curved or domed spatial shape, such as a shell or trough shape, of the second support body part. The wall thickness of the second support body part is typically in a range between 0.1 and 5 mm. The wall thickness of the second support body part 4 can be constant or vary in sections; in this way, the mechanical properties of the second support body part 4 can be adjusted locally in a targeted manner by varying the wall thickness accordingly.

The embodiments show that the second support body part 4 can have a curved or domed basic shape modeled on the curved or domed basic shape of the first support body part 3. The two support body parts 3, 4 can therefore be arranged essentially parallel, as can be seen in particular from FIGS. 1 and 4. Consequently, the second support body part 4 can be arranged or formed within the first support body part 4 with the proviso of a spacing forming a corresponding intermediate space 5. The underside of the first support body part 3, which faces the second support body part 4 and is, for example, curved or arched, can therefore enclose the upper side of the second support body part 4, which is, for example, curved or arched, at least in sections with the proviso of a spacing forming a corresponding gap 5.

The distance d between the first support body part 3 and the second support body part 4, defined in particular by the space 5 between the two support body parts 3, 4, can therefore be (essentially) constant in at least one spatial direction. Specifically, the distance d between the first support body part 3 and the second support body part 4 can be 1 mm, for example.

In all embodiment examples, a free space 6 is formed below the second support body part 4. The free space 6 extends between the underside of the second support body part 4 facing the base 7 and the upper side of the base 7 facing the second support body part 4 when the support device 1 is placed on a base 7, such as a table top, as intended. The support body 2 is therefore not a solid block, but a weight-optimized body, which can typically only be placed on a base 7 in the area of its outer edges, i.e. on the edge.

In order to further improve the mechanical properties of the support body 2, the support device 1 can comprise a support structure 8 which is arranged or formed extending within the intermediate space 5 between the first support body part 3 and the second support body part 4 and which comprises a plurality of support elements 8.1, for example strut-like or strut-shaped, connecting the first support body part 3 to the second support body part 4. The support structure 8 thus enables a local mechanical connection of the two support body parts 3, 4 via the support elements 8.1. In particular, the support elements 8.1 are designed to transmit forces acting on the first support body part 3 to the second support body part 4 when the support device 1 is used as intended. This possibility of force transmission can have a considerable positive influence on the mechanical properties of the support body 2.

FIGS. 2-4 show that the two support body parts 3, 4 can each have several openings 3.2, 4.2 and can therefore be designed with an opening structure defined by the respective openings 3.2, 4.2. The openings 3.2, 4.2 make it possible to save weight and—importantly for the aspect of implementing or integrating a practicable measure against unauthorized copying—to form a characteristic opening structure that can in principle be designed or shaped in any complex way, by means of which an original product can be distinguished from a copycat product.

Individual, several or all openings 3.2, 4.2 of the support body parts 3, 4 can have geometrically defined shapes, such as circular shapes, ellipsoids, polygons, etc. Alternatively or additionally, individual, several or all openings of the respective support body parts can have free forms. As can be seen by way of example in FIGS. 2-4, free-form shapes refer in particular to bionic shapes. Of course, hybrid shapes are also conceivable.

It can be seen from FIGS. 2-4 that openings 3.2 of the first support body part 3 can differ from openings 4.2 of the second support body part 4 with regard to at least one parameter relating to the geometric-constructive design of the respective opening 3.2, 4.2, such as dimensions, shape, etc.

The same applies to the arrangement of the respective openings 3.2, 4.2 in the first and second support body parts 3, 4, so that the arrangement of the openings 3.2, 4.2—also to be understood here as the distribution of the openings 3.2, 4.2 over a respective support body part 3, 4—can also differ.

In particular, it can be seen from the top view according to FIG. 3 that at least one opening 3.2 of the first support body part 3 can be arranged or formed offset relative to at least one opening 4.2 of the second support body part 4. An offset arrangement of the respective openings 3.2, 4.2, which is characterized in particular by a non-aligned arrangement of the wall sections of the support body parts 3, 4 delimiting the respective openings 3.2, 4.2, can also be a practicable measure which at least makes it more difficult to easily create unauthorized imitation products.

As indicated in FIG. 1, the support device 1 can have a footprint 9 for placing the support device 1 on a base 7. Specifically, it is indicated that a corresponding support surface 9 can be formed, for example, by a section of the first support body part 3 and/or the second support body part 4, in particular on the edge.

FIG. 4 shows, by way of example, that the support device 1 can also comprise a third support body part 10 forming a, in particular planar, support surface 9 for placing the support device 1 on a base 7, which can be connected or is connected to the first and/or the second support body part 3, 4. The third support body part 10 can also form a section of the first and/or second support body part 3, 4.

FIGS. 2-4 also show by way of example that the support device 1 can also have or comprise a support section 11 for receiving an end region of a metacarpal region, i.e. in particular a proximal end region, of a user's hand to be placed on the support device 1. In this way, a relaxing effect can also be achieved on a hand to be placed or placed on the support device 1. A corresponding further support section 11 can be configured in a predefined or standardized manner. Specifically, a corresponding further support section 11 can be designed, for example, as a predefined or standardized configured receptacle or recess.

FIGS. 2-4 also show, by way of example, that the respective finger support sections formed by the support contour sections 3.1.1 can merge, in particular directly, into the further support section 11. The respective finger support sections can therefore communicate, in particular directly, with the further support section 11. In this way, a particularly relaxing effect can also be achieved on a hand to be placed or placed on the support device.

Finally, FIGS. 2-4 show by way of example that in the first support body part 3 and/or in the second support body part 4 a fastening interface 3.3, in particular slot-like or slot-shaped, can be formed for fastening a fixing element (not shown), for example in the form of a strap or belt, for temporarily fixing a body part placed on the support contour 3.1, in particular in an intended support position and/or support orientation of the body part on the support contour 3.1.

For all embodiments, the first and/or the second support body part 3, 4 can also be an additively manufactured component. The same applies in particular to the other components of the support device 1, such as the support structure 8 and/or the third support body part 10. Accordingly, the entire support body 2 can be a body additively manufactured in an additive construction process.

It should be mentioned at this point that the support device 1 can basically be made of any material. Reference is only made to plastics, metals or ceramics by way of example. In addition to thermoplastics, such as technical thermoplastics, and thermosetting plastics, the term plastic also includes thermoplastic elastomers (TPE). It is also conceivable that the product could be made from a composite material or material structure comprising several different materials, i.e. materials that differ in at least one chemical and/or physical parameter. It is conceivable that at least the first and second support body parts 3, 4 are formed from different materials or material structures.

A method of manufacturing the support device 1 comprises at least the steps of: forming or providing a first support body part 3 having a support contour 3.1 for a body part to be supported; forming or providing a second support body part 4 connectable to the first support body part 3, and connecting the two support body parts 3, 4 by arranging or forming the second support body part 4 below the first support body part 3, forming a gap 5 extending between the first support body part 3 and the second support body part 4.

The invention claimed is:

1. A support device for supporting at least one hand of a user, comprising a support body for supporting the at least one hand of the user, wherein a first support body part comprising a support contour for the at least one hand of the user to be supported, and a second support body part which can be connected or is connected to the first support body part, wherein the second support body part is arranged or formed below the first support body part, forming an intermediate space extending between the first support body part and the second support body part, wherein the first support body part and the second support body part has an opening structure defined by a plurality of openings, wherein at least one opening of the plurality of openings of the first support body part is arranged or formed offset relative to at least one opening of the plurality of openings of the second support body part.

2. The support device according to claim 1, wherein the first support body part has a curved basic shape and the second support body part has a curved basic shape based on the curved basic shape of the first support body part.

3. The support device according to claim 1, wherein a distance between the first support body part and the second support body part, defined by the intermediate space, is constant in at least one spatial direction.

4. The support device according to claim 1, wherein a free space is formed below the second support body part.

5. The support device according to claim 1, wherein a support structure which is arranged or formed extending within the intermediate space between the first support body part and the second support body part and which comprises at least one support element connecting the first support body part to the second support body part.

6. The support device according to claim 1, wherein a third support body part forming a support surface for placing the support device on a base, which is connected to the first and/or the second support body part.

7. The support device according to claim 1, wherein the support contour comprises a certain number and/or a certain arrangement of predefined configured support contour sections, which corresponds to the number and/or arrangement of limb sections of a respective hand of the user to be placed on the support device.

8. The support device according to claim 1, wherein in the first support body part and/or in the second support body part a fastening interface is formed for fastening a fixing element for temporarily fixing the hand placed on the support contour.

9. A method for producing a support device for supporting at least one hand of a user, comprising a support body for supporting the at least one hand of the user at least in sections according to claim 1, comprising the steps of:

forming or providing a first support body part having a support contour for the hand to be supported;

forming or providing and a second support body part which can be connected to the first support body part; and connecting two support body parts in that the second support body part is arranged or formed below the first support body part, forming an intermediate space extending between the first support body part and the second support body part, wherein the first support body part and/or the second support body part has an opening structure defined by one or more openings.

* * * * *